United States Patent [19]

Shirley et al.

[11] Patent Number: 4,962,901
[45] Date of Patent: Oct. 16, 1990

[54] DRIVE MEMBER FOR A FISHING REEL

[76] Inventors: Ronald D. Shirley, 7310 N. Bank, Portland, Oreg. 97203; Michael D. Cowan, 3247 SE. Deswell St., Milwaukie, Oreg. 97267

[21] Appl. No.: 379,290
[22] Filed: Jul. 13, 1989
[51] Int. Cl.$^5$ .......................................... A01K 89/017
[52] U.S. Cl. .................................... 242/323; 242/250; 411/401
[58] Field of Search ................. 242/250, 323, 47, 100; 254/361; 411/401, 405, 408

[56] References Cited

U.S. PATENT DOCUMENTS

| | | | |
|---|---|---|---|
| 3,077,318 | 2/1963 | Du Val | 242/323 X |
| 3,102,447 | 9/1963 | Gregory et al. | 411/401 X |
| 3,126,166 | 3/1964 | Weinberg | 242/250 |
| 3,656,397 | 4/1972 | Kudelko | 411/408 |
| 4,196,864 | 4/1980 | Cole | 242/54 R |
| 4,290,584 | 9/1981 | Eckels et al. | 242/100 |
| 4,728,048 | 3/1988 | Batson | 242/47 |

Primary Examiner—Katherine Matecki
Attorney, Agent, or Firm—James D. Givnan, Jr.

[57] ABSTRACT

The drive member includes a threaded portion for installation on the crank shaft of a fishing reel. A head of the drive member is adapted to abut the reel crank to retain same in place on the crank shaft. A shank of the drive member projects outwardly from the drive member head and is of a cross section for inserted engagement with the chuck of a cordless screwdriver. The present drive member permits optional manual or powered reel operation.

7 Claims, 1 Drawing Sheet

U.S. Patent
Oct. 16, 1990
4,962,901
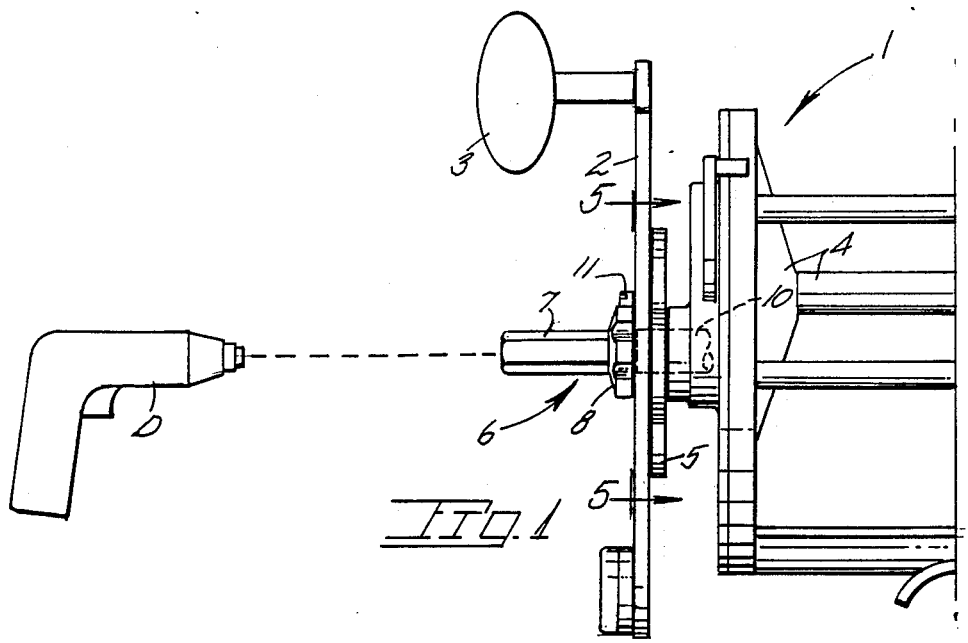

DRIVE MEMBER FOR A FISHING REEL

BACKGROUND OF THE INVENTION

The present invention pertains generally to fishing reels and particularly to motor driven reels.

Cranking a fishing reel to retrieve fish and/or lures and weights can present an arduous task for those impaired by health problems such as arthritis, heart disease and emphysema. It is highly desirable that those who have fished for a good part of their lives be enabled to continue to enjoy such a pastime which obviously contributes to their well-being. Certain types of fishing such as trolling or casting for salmon and steelhead trout entails using many feet of line, heavy weights and a lure all of which require considerable effort to retrieve and, of course, additional effort when a fish is on.

The prior art has disclosed motor powered fishing reels for the sport fisherman, but for one or more reasons the same are not in common public use. U.S. Pat. No. 4,784,346 discloses a reel having a swingably mounted motor mounted in a reel enclosure with the motor positionable to engage a worm drive. An electrical cable serves the motor. U.S. Pat. No. 3,460,778 discloses a motor driven reel including a permanently attached motor powered by a remote battery. U.S. Pat. No. 4,634,072 discloses a reel having an electric motor and battery source in a reel handle with no provision made for manual reel operation. U.S. Pat. No. 3,215,359 discloses a fishing reel with an optional drive using an airflow acting on a turbine. U.S. Pat. No. 4,739,944 discloses a reel with an electric motor housed in a reel handle with a motor shaft coupled to a worm gear which may also be manually driven. U.S. Pat. No. 3,077,318 discloses a motor permanently attached by brackets to a fishing reel with a motor shaft in threaded engagement with a spool driving shaft of the reel. The reel is not manually operable. Generally speaking such reels are of complex, costly construction and susceptible to damage by severe use as is typically encountered during reel use. Further, not all prior art reels are readily convertible from manual to a motor power source and vice versa.

SUMMARY OF THE PRESENT INVENTION

The present invention is embodied within a drive member for attachment to a fishing reel to permit momentary coupling of a mechanical power source thereto.

The drive member includes a shank which may be received within the chuck of a motor powered or cordless screwdriver to permit the latter to drive the spool of the reel to greatly reduce retrieval effort. As the chuck of a cordless screwdriver is simply a hexagonal socket there is no adjustment task to contend with, but rather only the applying of the driver chuck to the reel mounted drive member. A threaded stud of the drive member is accommodated by a threaded segment of a reel crank shaft. A head on the drive member confines the reel handle in place on said crank shaft.

Important objectives of the present invention include the provision of a drive member compatible with fish reel construction to permit installation on the reel without structural or permanent alteration of the reel either in the usual manner or and when so done permits the user to power the reel with a cordless screwdriver; the provision of a drive member for a fishing reel that is substitutable for the reel handle retainer nut; the provision of a drive member having a hexagonal shank for inserted coupling with the hexagonal socket in a cordless screwdriver chuck; the provision of a drive member for a fishing reel which permits either hand or motor power to be applied to the fishing reel with equal facility with no adjustment of reel components.

BRIEF DESCRIPTION OF THE DRAWINGS

In the accompanying drawings:

FIG. 1 is a fragmentary elevational view of a fishing reel with the present drive member in place;

FIG. 2 is an enlarged side elevational view of the drive member;

FIG. 3 is an end elevational view taken from the right side of FIG. 2;

FIG. 4 is a view similar to FIG. 2 but showing a modified drive member; and

FIG. 5 is a vertical sectional view taken along line 5—5 of FIG. 1.

DETAILED DESCRIPTION OF THE PREFERRED EMBODIMENTS

With continuing attention to the drawings wherein applied reference numerals indicate parts similarly hereinafter identified, the reference numeral 1 indicates generally a fishing reel of the casting type having a hand crank 2 and a hand grip 3. A reel spool is at 4 while a drag adjustment wheel is at 5. The foregoing is intended to be more or less a general description of a fishing reel. Reel configuration, of course, may vary with reel makes and models.

The drive member embodying the present invention is indicated generally at 6 and includes a shank 7 preferably an inch or so in length. The shank is preferably of polygonal section such as of the hexagonal shape shown. The shank terminates at one end in mergence with a head portion 8 having a wall surface 8A for abutment with crank 2 to retain same in place on the end of a reel crank shaft 10. Typically such crank shafts have a pair of planar surfaces 10A (FIG. 5) therealong to receive a correspondingly shaped crank opening to assure a no slip connection between crank and shaft. Peripheral recesses at 8B may be provided in the head periphery to receive a crank mounted lock screw 11.

A stud 9 on the head portion 8 is threaded at 9A to engage female threads on the end segment of the reel crank shaft.

To utilize the present drive member, the original fastener retaining handle 2 on the reel crank shaft is removed from the present member thereafter threadedly engaged with the reel shaft. Surface 8A of the drive member will bear against crank 2 to maintain the crank in place on shaft 10. Cordless screwdriver D is of a size to be conveniently carried on the person and is axially engageable with shank 7 of the drive member. As above noted, cordless screwdriver chucks are non-adjustable. At any time during retrieval, the powered driver is axially disengageable from shank 7 to permit optional manual cranking of the reel. Shank 7 of the drive member does not interfere with hand rotation of the crank.

Various makes and models of fishing reels will have different crank to crank shaft engagements necessitating various thread styles for the threaded member 9 of the present drive member. For example, FIG. 4 discloses a modified drive member wherein prime reference numerals indicate parts above identified with like base reference numerals wherein the threaded member 9' is internal of head 8' with internal threads 9A' to engage the external threads of a reel crank shaft. Further, the head 8' of the drive member may vary to best suit crank configuration.

While we have shown but a few embodiments of the invention, it will be apparent to those skilled in the art that the invention may be embodied still otherwise without departing from the spirit and scope of the invention.

Having thus described the invention, what is desired to be secured by a Letters Patent is:

We claim:

1. A drive member for installation on a fishing reel, said reel having a drive shaft provided with a hand crank, said drive member permitting optional powering of the reel with a motor, said drive member comprising,
   a shank having flats thereon for engagement with a chuck of a battery powered power source,
   a head at one end of said shank having a wall surface for abutment with the hand crank, the head securing the hand crank on said drive shaft, said head having a peripheral edge defining a series of recessed areas in which a locking screw may be located to prevent movement between said head and the hand crank, and
   a threaded member integral with said head for threaded engagement with the drive shaft of the fishing reel.

2. The drive member claimed in claim 1 wherein the threaded member has external threads.

3. The drive member claimed in claim 1 wherein the threaded member has internal screw threads.

4. The drive member claimed in claim 3 wherein the internal screw threads are within said head.

5. The drive member claimed in claim 1 wherein said shank is of hexagonal section for insertion within a chuck of a battery powered screwdriver.

6. In combination,
   a fishing reel having a crankshaft,
   a crank handle on said crankshaft,
   a drive member in threaded engagement with said shaft and including a head for abutment with the crank handle said head having a peripheral edge defining a series of recessed areas in which a locking screw may be located to prevent relative movement between said head and the crank handle, and
   a shank integral with said head for axial engagement with a chuck for a battery powered screwdriver.

7. A drive member for installation on a fishing reel, said reel having a drive shaft provided with a hand crank, said drive member permitting optional powering of the reel with a motor, said drive member comprising,
   a shank having hexagonally disposed flats thereon for engagement with a chuck of a battery powered power source,
   a head at one end of said shank having a wall surface for abutment with the head crank, the head securing the hand crank on said drive shaft, and
   a threaded member having integral screw threaded integral with and internally of said head for threaded engagement with the drive shaft of the fishing reel.

* * * * *